UNITED STATES PATENT OFFICE

ROBERT FRASER THOMSON AND JOHN THOMAS, OF GRANGEMOUTH, SCOTLAND, ASSIGNORS TO SCOTTISH DYES, LIMITED, OF GRANGEMOUTH, SCOTLAND

PROCESS OF PREPARING DYESTUFFS AND INTERMEDIATES FROM BENZANTHRONE DERIVATIVES

No Drawing. Application filed April 8, 1927, Serial No. 182,172, and in Great Britain April 22, 1926.

This invention relates to the manufacture of dyestuffs and intermediates for the production of dyestuffs.

The invention in brief consists in a process for the production of dibenzanthronyl bodies and hydroxy benzanthrone compounds from chloro substituted and methyl substituted benzanthrones having the positions 2 and Bz1 free by treating these bodies in solution in sulphuric acid with manganese dioxide preferably at a temperature not exceeding 60° C. especially at a temperature between about 0° C. and 20° C.

The invention also consists in improved processes substantially as indicated herein and in products which may be produced thereby or by the equivalents of these processes.

The following examples illustrate how the invention may be carried into effect, all parts being parts by weight:—

Example 1

This deals with the condensation and oxidation of 6-chlor-benzanthrone (melting point 183° to 185° C.). 6-chlor-benzanthrone may be prepared by Scholl's method (Berichte 55, Part I, page 114).

10 parts of 6-chlor-benzanthrone prepared as above described are dissolved in 70 parts of 96 per cent. $H_2SO_4$, the solution being well cooled. A solution is then prepared of 8 parts of manganese dioxide in 80 parts of 96 per cent. $H_2SO_4$ (the solution being assisted by raising the temperature to about 105° C.) After cooling the solution to 0° C. it is slowly added to the solution of 6-chlorbenzanthrone in 96 per cent. $H_2SO_4$. The mixture is kept at 0° C. for 4 hours, with continuous stirring. After this the temperature is allowed to rise to 10° C. for a period of 24 hours. The solution is then worked up in the usual way; for example, by pouring into 500 parts water, to which are added 6 parts of sodium bisulphite, and the whole then boiled. The dark brown precipitate is filtered off and consists of a mixture of hydroxy-chlor-benzanthrone and apparently a dichlor-dibenzanthronyl body. The hydroxy body that has been formed is removed by extraction with caustic soda solution, and on acidification the required hydroxy-chlorbenzanthrone is precipitated and can be filtered, washed and dried. This product can be alkylated in the usual way and condensed to give the corresponding alkhydroxy-chlordibenzanthrones.

Unchanged chlor-benzanthrone present may be removed by extraction with benzene. The dichlor-dibenzanthronyl body that is obtained is a dark greenish powder melting over 300° C. It gives a characteristic red violet solution in sulphuric acid. If it is fused with potash (preferably alcoholic) a blue melt is obtained from which a dark blue dyestuff, resembling dibenzanthrone, is obtained.

The structural formula of the dichlordibenzanthronyl compound is probably as follows:

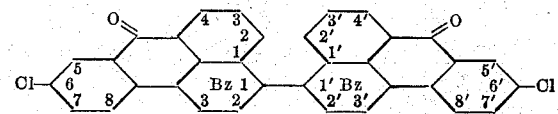

6.6'-dichlor-Bz1-Bz1'-dibenzanthronyl.

If the oxidation has been carried too far, a violet product is obtained which does not vat readily.

Example 2

This deals with the employment as a starting product of iso chlor-benzanthrones prepared by condensation of 2-chlor-anthraquinone with glycerine.

According to this example 2-chlor-anthraquinone is submitted to a process of condensation with glycerine and the resulting product treated by the method of Example 1.

We have found that if the chlor-benzanthrone that is obtained by the condensation of 2-chlor-anthraquinone with glycerine be subjected to similar treatment to that described in Example 1, the yields of hydroxy-chlor-benzanthrone and dichlor-dibenzanthronyl are poor.

We believe that this may be attributed to the fact that a single body is not obtained by the condensation of 2-chlor-anthraquinone with glycerine in the usual way.

The 2-chlor-benzanthrone which melts at 189–190.5° C. does not apparently give dibenzanthronyls by the method of Example 1, but the two isometric bodies which are obtained simultaneously, namely the chlor-benzanthrone, melting at 130–134° C., and the chlor-benzanthrone, melting at 148–150° C., will when treated by the method of Example 1, give good yields of dibenzanthronyls.

*Example 3*

This deals with the employment of chlor-benzanthrones obtained by condensation of 1-chlor-anthraquinone with glycerine.

According to this example, 1-chlor-anthraquinone is submitted to a process of condensation with glycerine and the product treated with manganese dioxide and sulphuric acid in the cold by method of Example 1.

As a result there is obtained what is apparently a dichlor Bz1-Bz1'-dibenzanthronyl which can be characterized by its colouration in sulphuric acid and also by the fact that it gives a dibenzanthrone on fusion with potash.

By the condensation of 1-chlor-anthraquinone with glycerine there are apparently obtained two mono-chlor-benzanthrones one of which melts at about 180.5–181.5° C. and the other apparently an alpha-chlor-benzanthrone melts at about 154–160° C. Either of these products or a combination of both may be used according to the present example.

*Example 4*

This example deals with the employment of methyl-benzanthrones having the 2 and Bz1 positions free.

According to this example, methyl-benzanthrones as indicated are treated by the method of Example 1.

If the product obtained by condensing 2-methyl-anthraquinone with glycerine, that is crude methyl benzanthrone, is treated by the method of Example 1, we have found that the yield of dibenzanthronyl body is poor. Further, pure 2-methyl-benzanthrone does not appear to give a Bz1-Bz1'-dibenzanthronyl when treated by the method of Example 1. Methyl-benzanthrones which are not substituted in the 2 position such as may be obtained in varying amounts when 2-methyl-anthraquinone is condensed with glycerine, in these circumstances give dibenzanthronyls which are characterized by the usual tests, namely a red violet solution in sulphuric acid and conversion by potash fusion to dibenzanthrone bodies.

*General*

The products of the processes may be treated as described in U. S. specification No. 1,607,491 and the processes described may be modified on the lines of the processes of that specification.

Having now described our invention, what we claim as new and desire to secure by Letters Patent is:—

1. In the process of preparing dibenzanthronyl bodies and hydroxy benzanthrone compounds, the step which comprises subjecting a halogenated benzanthrone in a liquid medium to the action of manganese dioxide.

2. In the process of preparing dibenzanthronyl bodies and hydroxy benzanthrone compounds the step which comprises subjecting a halogenated benzanthrone in sulphuric acid to the action of manganese dioxide.

3. In the process of preparing dibenzanthronyl bodies and hydroxy benzanthrone compounds, the step which consists in subjecting substituted benzanthrones to the action of manganese dioxide and sulphuric acid, said benzanthrones comprising the type

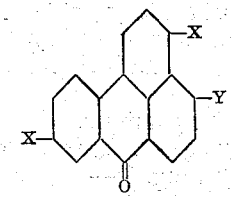

in which X represents H or Cl; Y represents H, Cl or $CH_3$ and not more than one Cl atom existing in the nucleus at the same time; and when Y represents $CH_3$ then X represents H.

4. In the process of preparing dibenzanthronyl bodies and hydroxy benzanthrone compounds, the step which consists in subjecting to action of manganese dioxide benzanthrones comprising the type

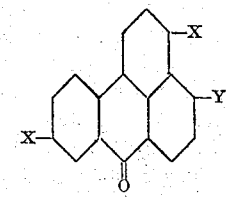

in which X represents H or Cl; Y represents H, Cl or $CH_3$ and not more than one Cl atom existing in the nucleus at the same time; and when Y represents $CH_3$ then X represents H.

5. In the process of preparing dibenzanthronyl bodies and hydroxy benzanthrone compounds, the step which consists in subjecting to action of manganese dioxide benzanthrones comprising the type

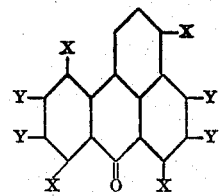

in which X represents H or Cl; Y represents H, Cl or $CH_3$ and not more than one Cl atom existing in the nucleus at the same time; and when Y represents $CH_3$ then X represents H.

In testimony whereof we have signed our names to this specification.

ROBERT FRASER THOMSON.
JOHN THOMAS.